United States Patent [19]

Rider et al.

[11] 4,063,283
[45] Dec. 13, 1977

[54] AUTOMATIC ENVELOPE MEASURING SYSTEM

[75] Inventors: Aern E. Rider; Donald R. Neal, both of Hanover, Pa.

[73] Assignee: Chemetron Corporation, Chicago, Ill.

[21] Appl. No.: 564,788

[22] Filed: Apr. 3, 1975

[51] Int. Cl.$^2$ .......................... H04N 3/00; G01C 3/00; G01B 11/28

[52] U.S. Cl. ...................................... 358/107; 340/61; 354/63; 356/1; 356/4; 356/141; 356/157

[58] Field of Search .................... 33/1 Q, 338; 356/1, 356/4, 141, 152, 157; 340/61; 354/63; 358/96, 107

[56] References Cited

U.S. PATENT DOCUMENTS

| | | | |
|---|---|---|---|
| 3,168,023 | 2/1965 | Harmon | 33/281 |
| 3,532,037 | 10/1970 | Auphan | 354/63 |
| 3,610,754 | 10/1971 | Pirlet | 356/1 |
| 3,705,772 | 12/1972 | Andreas | 356/5 |
| 3,796,492 | 3/1974 | Cullen | 356/4 |
| 3,950,096 | 4/1976 | Aeschlimann et al. | 356/1 |

*Primary Examiner*—S. C. Buczinski

[57] ABSTRACT

A system for automatically measuring a clearance envelope about a path of travel in a specific embodiment includes a laser and a rotating reflector mounted on a moving vehicle for radially scanning the region around the path of travel in a direction generally perpendicular to the path of travel. A television camera is mounted on the vehicle and is responsive to light from the laser that has been reflected by objects located within the viewing field of the camera. The television camera is radially scanned and provides analog video signals representative of the radial distances between the reflector and the scanned objects. An analog video tape recorder is utilized to record on video tape the distance representative video signals together with binary codes or identification numbers identifying the camera radial scanning information. The video tape may be played at a central or home office where the distance representative analog video signals may be converted to digital computer compatible binary form for suitable processing and storing by the computer.

24 Claims, 5 Drawing Figures

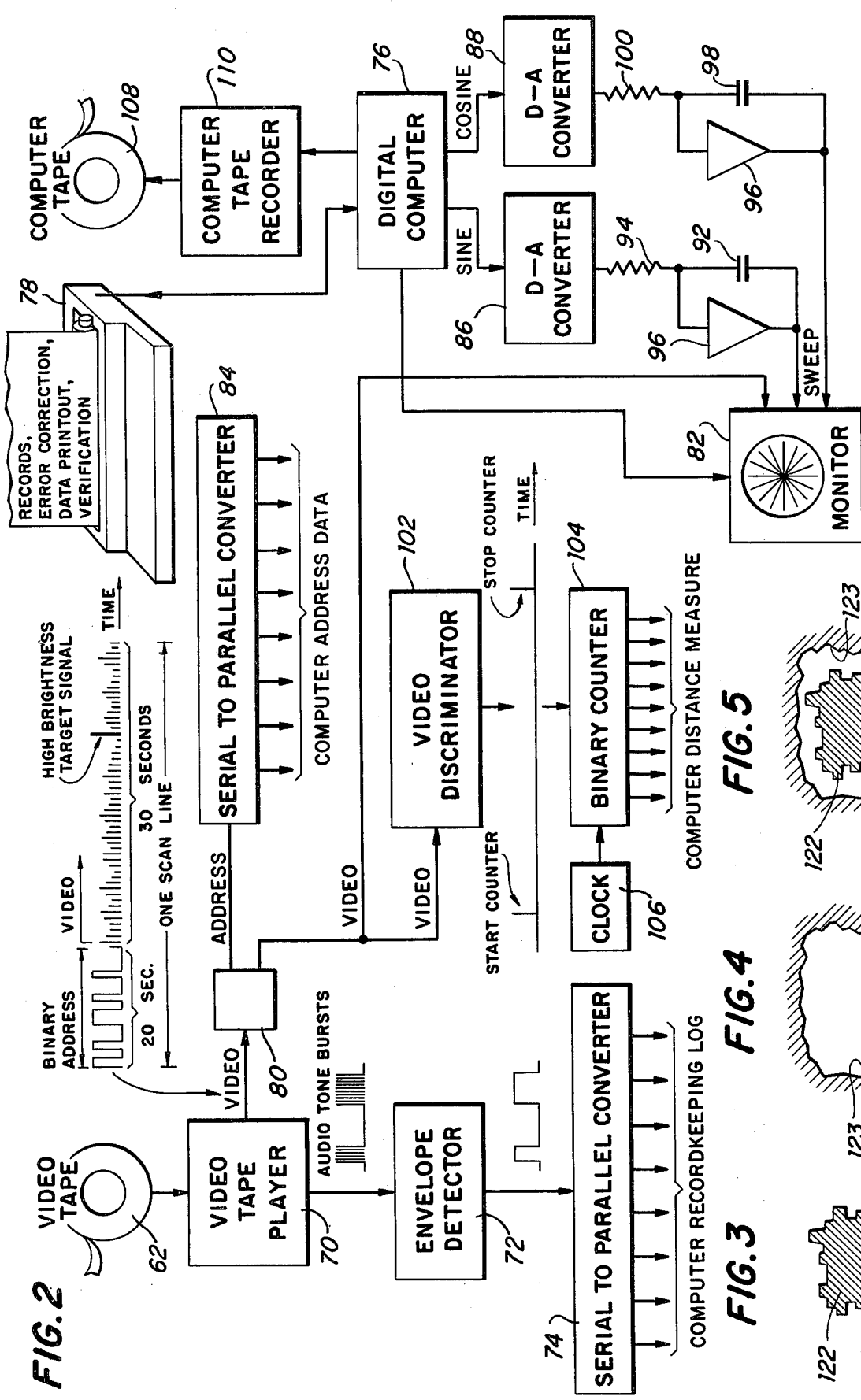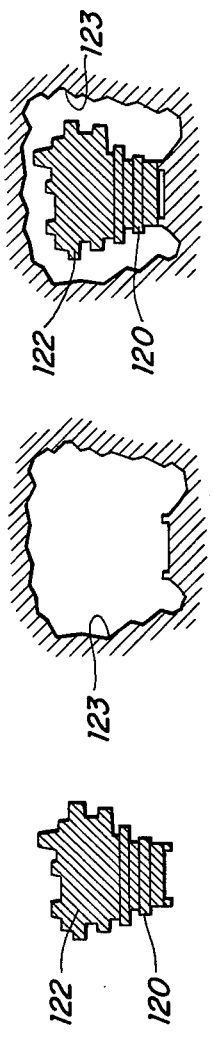

AUTOMATIC ENVELOPE MEASURING SYSTEM

BACKGROUND OF THE INVENTION

A. Field of the Invention

The present invention generally relates to measuring systems and, more particularly, to systems for determining an envelope, such as a clearance or maximum cargo envelope, about a path of travel, for example, a section of railroad tracks.

B. Description of the Prior Art

A need exists for railroads to determine the maximum cargo size that may be transported on a railroad car along a section of railroad track or along a specific railroad route. This need particularly exists when it is desired to transport an oversize load on a railroad car. The clearance or maximum cargo envelope about the railroad track over a particular section or along an entire route must be known before an oversize load can be shipped without fear of damage.

In the past, efficient, inexpensive and rapid systems have not been available for determining clearance or maximum cargon envelopes about sections of railroad tracks. Two prior art devices or systems are described in U.S. Pat. Nos. 3,168,023 (Harmon) and 3,705,772 (Andreas). The device described in the Harmon patent utilizes a high pressure arc lamp mounted on a railroad vehicle for projecting a plane of light radially along the path of travel of the vehicle. A photographic camera having a wide angle lens is utilized periodically to photograph and record on a photographic film medium the obstacles along the path of travel illuminated by the plane of light. The resulting photographs may then be viewed on a calibrated viewing screen to determine the clearance envelope at the point where each photograph was taken.

The device described in the Andreas patent utilizes a mobile computer controlled scanning system utilizing a light emitting diode and a rotating mirror to provide a radially directed rotating beam for illuminating objects along the path of travel. The computer controlled system collects the reflected light beam and ultimately generates binary data representative of the radial distances on a number of points along a preselected portion of each 360° sweep of the beam. The data for each sweep is compared by the mobile computer with the data obtained from successive sweeps. Normally, only the data representing the smallest distance along any radial line is stored by the remote computer and periodically placed on a suitable output medium for further processing by a centrally located computer.

While these systems provide a way to determine clearance or maximum cargo envelopes about a path of travel, the photographic system requires each photograph to be individually viewed and the clearance envelope information provided by each photograph to be tabulated. Furthermore, obstacles located between the photographed areas will not be detected. These undetected obstacles can cause damage to a railroad cargo.

The computer controlled system provides a more convenient way of collecting and tabulating the results of the radial distance measurements; however, the system is relatively complex and requires the use of a mobile computer to control the system and to process the data. Such mobile computers are relatively expensive and are subject to damage by the shock and vibrations often encountered on a railroad vehicle. Furthermore, the computer controlled system only stores and outputs selected data, such as periodically determined minimum radial distance data, thereby limiting the flexibility of the system and precluding subsequent error checking of the data by comparing the results of successive scans.

SUMMARY OF THE INVENTION

An object of the present invention is to provide a new and improved envelope measuring system.

Another object of the present invention is to provide a new and improved system for automatically measuring a clearance or maximum cargo envelope along a path of travel, such as a section of railroad tracks.

Another object of the present invention is to provide a new and improved video system for measuring a clearance or maximum cargo envelope along a path of travel that provides an analog video tape record of the envelope suitable for subsequent processing by a centrally located digital computer.

Another object of the present invention is to provide a new and improved video system for measuring a clearance or maximum cargo envelope along a path of travel that provides a complete record of all data obtained.

Another object of the present invention is to provide a relatively simple and inexpensive system for automatically measuring a clearance or maximum cargo envelope along a path of travel that does not require the use of a mobile computer.

Briefly, in accordance with a preferred embodiment of the present invention, a source of coherent light is mounted on a railroad car and radially scans objects in the proximity of the road bed or tracks. The radially scanned light source is generated by a laser beam that emits a coherent infrared light beam along the direction of travel of the railroad car. The emitted light beam is radially deflected by a rotating mirror or other suitable reflector aligned with the emitted light beam for radially reflecting the emitted light beam in a direction perpendicular to the direction of travel of the railroad car to provide a helical scan of the region about the road bed or railroad tracks.

A television camera is mounted on the railroad car in close proximity to the laser and receives light from the laser that has been reflected back to the camera by objects in the scanned area. The television camera is radially scanned and generates an analog video signal representative of the shape of the clearance envelope around the road bed. The clearance envelope may be displayed on a radially scanned monitor and is recorded on video tape for subsequent processing by a remote or centrally located digital computer. A binary code is assigned to each radial scanning line and recorded together with the analog video signal information to indicate the scanning direction corresponding to each line of recorded video information.

A centrally located digital computer system advantageously processes the data recorded on the video tape by the mobile measuring system. The computer system includes a digital-to-analog converter for converting the analog signal recorded on the video tape to a binary signal usable for subsequent processing by the computer. The digital signals are stored in the computer which may be programmed to regenerate and display the clearance envelope at any desired location along a railroad route. Furthermore, the dimensions of any oversize load may be entered into the computer; and the computer programmed to display both the cross section of the load together with the clearance or maximum cargo envelope along a railroad route. Such a system permits an operator visually to determine whether the load can be safely transported along the selected railroad route. As a result, the most direct route over which an oversize load may be safely shipped can be determined quickly and inexpensively.

BRIEF DESCRIPTION OF THE DRAWING

The above and other objects and advantages and novel features of the present invention will become apparent from the following detailed description of a preferred embodiment of the invention illustrated in the accompanying drawing wherein:

FIG. 2 is a block diagram of the centrally located portion of the measuring and determining system of FIG. 1;

FIG. 3 is an illustration of the cross section of a railroad vehicle and its load or cargo;

FIG. 4 is an illustration of a clearance envelope as determined by the envelope measuring and determining system of FIG. 1; and FIG. 5 is an illustration of a composite display of a clearance envelope and vehicle and its cargo or load.

DETAILED DESCRIPTION OF A PREFERRED EMBODIMENT

Figure 1:
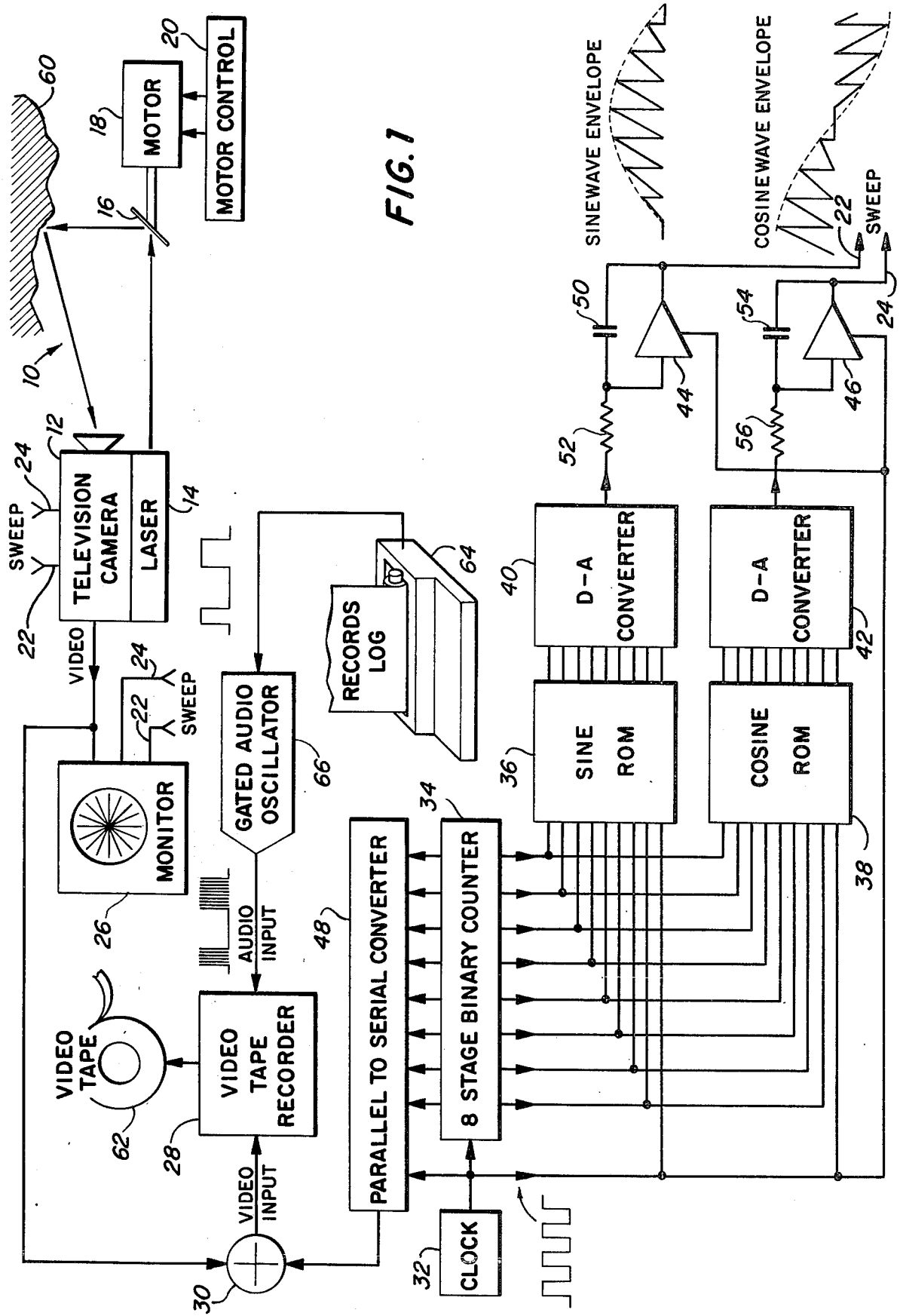
FIG. 1 is a block diagram of the mobile or vehicle carried portion of an envelope measuring and determining system constructed in accordance with the principles of the present invention.

Referring to FIG. 1, the mobile or vehicular portion of a clearance or maximum cargo envelope measuring system constructed in accordance with the principles of the present invention includes a radial scanning section 10 having a television camera 12, a continuous wave infrared laser 14 and a reflector or mirror 16 that is rotated at a variably controlled speed by a motor 18. The direction of emission from the laser 14 is along the direction of travel of the vehicle; and the mirror 16 is oriented at a 45° angle with respect to the direction of emission of the laser 14. The mirror 16 is rotated by the motor 18 about an axis of rotation parallel with the direction of travel of the vehicle and deflects the emitted laser beam perpendicularly to and radially about the path of travel of the vehicle. When the vehicle is stationary, the laser beam is deflected in a plane perpendicular to the direction of the tracks; and when the vehicle is in motion, the beam is helical in nature with the pitch of the helix being proportional to the speed of the vehicle. The pitch of the helix is also determined by the rotational speed of the mirror 16 which is controlled by the speed of the motor 18 under the control of a variable speed motor control 20. Consequently, the pitch of the helix and the ability of the scanning section 10 to detect small objects located between radial scans is controlled by controlling the speed of the vehicle and the rotational speed of the mirror 16. A lower safety limit on the rotational speed of the mirror 16 is imposed to prevent excessive laser beam power from being concentrated in any one area.

The television camera 12 is chosen for its sensitivity to infrared radiation and is equipped with filters to attenuate undesirable background optical frequency radiation, such as light from street lamps and automobile headlights. In order to further reduce the effects of extraneous light on the operation of the television camera 12, the system according to the invention is preferably operated at night.

The television camera 12 is swept in a radial mode by sweep signals applied to a pair of horizontal and vertical sweep inputs from sweep input lines 22 and 24, respectively. The video output of the camera 12 is applied to a radially swept television monitor 25 and to the video input of an analog video tape recorder 29 by means of a multiplexer 30. The monitor 30 and the recorder 28 permit the operator of the system to record the analog video signal from the camera 12 for subsequent processing and evaluation and to visually monitor the signal as it is being recorded.

The radial sweep signals for the camera 12 and the monitor 26 are synthesized from a pair of sinusoidally varying horizontal and vertical sweep components provided by a clock 32 that operates at 500kHz in a specific embodiment, an eight stage binary counter 34, a pair of read-only memories 36 and 38, a pair of digital-to-analog converters 40 and 42, and a pair of operational amplifiers 44 and 46 which are connected as Miller integrators. The outputs of the operational amplifiers 44 and 46 are connected to the horizontal and vertical sweep circuits by means of the lines 22 and 24, respectively, to provide the horizontal and vertical components of the radial sweep to the horizontal and vertical deflection circuits of the camera 12. The output of the eight stage binary counter 34 is also applied to a parallel-to-serial converter 48 for application to the video tape recorder 28 via the multiplexer 30.

The eight stage binary counter 34 counts clock pulses from the clock 32 and provides a zero to 511 count to the read-only memories 36 and 38. Hence, 512 different addresses (zero to 511) are generated by the binary counter 34, each of the binary addresses corresponding to a different one of 512 radial scanning lines for the television camera 12 and the monitor 26. Consequently, 512 scanning lines are generated over the 360° radial scan to provide a resolution of less than 1° per scan.

More specifically, the binary numbers generated by the binary counter 34 are applied to the sine read-only memory 36 and the cosine read-only memory 38 to address specific address locations in each. The sine read-only memory 36 has stored in each of its address locations a binary representation of the sine of the angle of the scanning line represented by the value of the count from the binary counter 34. Similarly, each address location of the cosine read-only memory 38 has stored therein a binary value representing the cosine of the angle of the radial scanning line represented by the number in the binary counter 34. Consequently, the output of the read-only memory 36 is a series of binary numbers representative of the sines of each of the angles of each of the 512 radial scanning lines; and the output of the read-only memory 38 is a series of binary numbers representative of the cosines of the angles of each of the 512 radial scanning lines.

The outputs of the read-only memories 36 and 38 are connected to the digital-to-analog converters 40 and 42 to convert the binary numbers from the read-only memories 36 and 38 to analog signals each having an amplitude corresponding to the value of the binary number from the read-only memories 36 and 38. Since the amplitudes of the output signals from the digital-to-analog converters 40 and 42 change only during the time the value of the count in the eight stage binary counter 34 is incremented, the output signals from the digital-to-analog converters 40 and 42 are a series of voltage steps approximating a sine wave and a cosine wave, respectively.

The operational amplifier 44 is connected as an inverting amplifier, has a capacitor 50 connected between its input and output terminals and serves as a Miller effect capacitance multiplier. Consequently, the input capacitance of the amplifier 44-capacitor 50 combination is substantially equal to the capacity of the capacitor 50 multiplied by an amount proportional to the gain of the amplifier 44. Similarly, the input capacitance of the amplifier 46-capacitor 45 combination is substantially equal to the capacity of the capacitor 54 multiplied by an amount proportional to the gain of the amplifier 46. When signals are applied to the amplifiers 44 and 46 through a pair of resistors such as the resistors 52 and 56, each of the circuits operates as a nearly ideal integrator for integrating the signals from the digital-to-analog converters 40 and 42.

The integrated signals from the amplifiers 44 and 46 are applied to the lines 22 and 24, respectively, and serve as the horizontal and vertical sweep signals for the television camera 12 and the monitor 26. The amplifiers 44 and 46 are reset at the beginning of each clock pulse so that the output from each of the amplifiers 44 and 46 is a series of variable slope ramps, the slope of each of the ramps being proportional to the amplitude of one of the voltage steps provided by the respective digital-to-analog converters 40 and 42. Since the output signals from the digital-to-analog converters 40 and 42 are stepped approximations of sine and cosine functions, respectively, the envelope of the variable slope ramp signal from the amplifier 44 varies as a sine function; and the envelope of the ramp signal from the amplifier 46 varies as a cosine function, thereby providing the desired radial sweep.

In operation, as the measuring vehicle proceeds down the tracks, the mirror 16 is rotated by the motor 18 and causes the laser 14 to scan the terrain in the proximity of the tracks. When an obstacle such as an obstacle 60 is encountered, a portion of the obstacle is illuminated by the laser beam. The illuminated area is viewed by the television camera 12.

When the television camera 12 is properly focused and aligned with the laser 14, the illuminated spot on the obstacle 60 is projected onto an area on the target of the television camera vidicon that is displaced from the center of the target by an amount proportional to the radial distance between the rotating mirror 16 and the obstacle 60. Consequently, as the mirror 16 rotates, the area illuminated by the laser 14 progresses helically along the obstacle and provides an image on the target of the television camera vidicon having a shape similar to the shape of the cross section of the area between the rotating mirror 16 and the obstacle 60. If the vehicle were proceeding through a tunnel, the image projected onto the target of the television camera vidicon may be similar to the image shown in FIG. 4.

A television camera vidicon has the characteristic that the beam current of the vidicon is relatively low when the target of the vidicon is not illuminated. As a result, when the scanning beam of the vidicon is swept along the target, very little beam current flows through the vidicon until an illuminated area is reached. At this point, the current through the vidicon increases, and the location of the illuminated portion of the target may be determined. In a typical television camera such as the television camera 12, a signal representative of the vidicon beam current is generated and amplified by video amplifier circuitry (not shown) to provide a video output signal that may be recorded by the video tape recorder 28.

The system illustrated in FIG. 1 is designed so that the television camera 12 responds primarily to the output of the laser 14. As a result, the amplitude of the video signal from the camera 12 remains at a relatively low level until the portion of the vidicon target that is illuminated by the reflected light from the laser 14 is scanned. At this point, a sharp pulse is generated in the video signal, with the time interval between the initiation of the scan and the generation of the sharp video pulse being indicative of the radial distance to the obstacle 60. Since the vidicon has a certain amount of "persistance", the rotation of the mirror 16 need not be synchronized with the radial sweep of the television camera 12.

The output of the eight stage binary counter 34 is converted to serial form by the parallel-to-serial converter 48 and applied to the video input of the video tape recorder 28 to identify the radial line being scanned. The multiplexer 30 is synchronized to the clock 32 and causes the value of the count in the binary counter 34 to be recorded at the initiation of each radial scanning line, with the analog video signal from the television camera 12 being recorded for the remainder of the scanning line. Consequently, the information recorded by the video tape recorder 28 consists of a binary identification number for each of the 512 scanning lines followed by the analog video signal resulting from the radial scan along that line. Thus, the video data may easily be retrieved and processed since each radial scanning line is identified and the analog video signal corresponding to only one scanning line is recorded between the binary line identification signals. This information is recorded on a video tape 62 which is then processed by a centrally located computer processing system (FIG. 2).

The audio track of the video tape 62 may be used to record operator comments relating to location, terrain or any unusual characteristic of the area being scanned. This may be accomplished by connecting a microphone to the audio input of the video tape recorder 28; however, in a preferred embodiment to reduce errors resulting from noise, a keyboard input terminal 64 is utilized to drive a gated audio oscillator 66 to provide an audio, frequency modulated, binary input signal in the form of tone bursts to the audio track of the video tape 62.

The centrally located computer processing system (FIG. 2) includes an analog video tape player 70 for playing back the video tape 62. The audio output binary signal of the video tape player 70 is applied to an envelope detector 72 which converts the recorded tone bursts back to binary information. The serial binary information is reconverted to parallel form by a serial-to-parallel converter 74 and applied to the record keeping log of a digital computer 76 where it may be stored by the computer 76 or printed out on a terminal 78.

The video output signal from the tape player 70, which contains the binary number (address) identifying each scanning line and the analog video information for that line, is applied to a demultiplexer 80 which separates the binary address and the analog video signal portions of the video output from the video tape player 70. The analog video signal from the demultiplexer 80 is connected to the video input of a monitor 82; and the binary address is converted from serial to parallel form by a serial-to-parallel converter 84 and applied to the computer 76. The address information from the converter 84 addresses certain locations in the computer 76 to provide the sine and cosine of the angle of the radial line represented by the address. The sine and cosine generating hardware may include a pair of read-only memories such as the read-only memories 36 and 38 (FIG. 1) or may be preprogrammed into the computer 76 by means of software.

The digital sine and cosine information from the computer 76 is applied to a pair of digital-to-analog converters 86 and 88 (analogous to the digital-to-analog converters 40 and 42 of FIG. 1) which convert the digital sine and cosine signals from the computer 76 into stepped approximations of the sine and cosine functions. The analog signal from the digital-to-analog converter 86 is integrated by the combination of an operational amplifier 90, a feedback capacitor 92 and a series resistor 94 to provide the vertical sweep signal for the monitor 82. Similarly, the combination of the operational amplifier 96, the feedback capacitor 98 and the series resistor 100 integrates the signal from the digital-to-analog converter 88 to provide the horizontal sweep signal for the monitor 82. As a result, the analog video information stored on the video tape 62 may be displayed on a monitor 82 similar to the monitor 26 of FIG. 1 to provide a visual indication of the stored information.

The video signal from the demultiplexing circuit 80 is also converted to digital form for processing by the computer 76 to determine clearance envelopes and to provide the minimum clearance or the maximum cargo envelope along any particular section of tracks. The conversion is accomplished by a video discriminator 102 that controls a binary counter 104. The video discriminator 102 is an amplitude sensitive device that provides an output signal when the level of the video signal applied to its input exceeds a predetermined level.

The video output signal from the video tape player 70 contains three basic components: a binary address portion, an analog extraneous video portion caused by extraneous sources of illumination, and an analog high brightness signal generated by the reflections from the rotating laser beam. The amplitude of the high brightness signal is greater than the amplitude of the extraneous video signals. Consequently, if the threshold of the video discriminator 102 is set above the level of the extraneous video signals and below the level of the high brightness target signal, the video discriminator 102 will provide an output signal only upon receipt of the high brightness signal. In addition, if the video discriminator is synchronized to the scanning circuits, it can be made to provide a pulse at the beginning of each scanning line. The time interval between the pulse generated at the beginning of the scanning line and the pulse generated by the high brightness signal is indicative of the radial distance between the vehicle and the obstacle being scanned by the laser.

The binary counter 104 counts pulses from a clock 106. The counting is initiated by the pulse generated at the beginning of each scanning line and terminated by the pulse generated by the high brightness target signal. Since the time interval between the start and stop pulses is proportional to the distance between the rotating mirror 16 and the obstacle 60 and the number of pulses counted is proportional to the time interval between the start and stop pulses, the final count stored in the binary counter 104 at the end of each radial scanning line interval provides a binary indication of the radial distance between the mirror 16 and the obstacle 60 along that line. The actual radial distance may be determined by the computer 76, may be stored therein for further processing and may be recorded on computer tape 108 by means of a computer tape recorder 110. The data stored in the computer 76 may be manipulated by the terminal 78 to correct and verify the data. The terminal 78 may also be used to program the computer to print or display the clearance envelope around any selected point along the track or a minimum clearance or maximum cargo envelope over a predetermined section of tracks to determine the maximum cargo or load that can be shipped along that section of tracks.

The frequency of the clock 106 should be sufficiently high that a sufficiently large number of pulses are counted between the initiation and the termination of the counting by the counter 104, thereby to permit accurate resolution of the clearance envelope. If the frequency of the clock 106 is too low, the system will have poor resolution, while if the frequency of the clock 106 is too high, the circuitry of the binary counter 104 will be unnecessarily complex. In a preferred embodiment, the frequency of the clock 106 is selected such that approximately 512 pulses are generated during the time interval of one radial scanning line. This permits an eight stage binary counter 104 to be used as the binary counter 104 while maintaining sufficient resolution to provide a highly accurate system.

Synchronization for the system illustrated in FIG. 2 may be provided in a variety of ways. For example, the clock signal from the clock 32 may be recorded on the video tape 62 and recovered to generate a synchronizing pulse for starting the binary counter 104, resetting the operational amplifier integrators 90 and 96 and synchronizing the computer 76 and the various converters in the system. Alternately, a clock recovery circuit may be connected to the address output of the demultiplexer 80 to recover clock information from the binary address portion of the recorded video signal.

The system according to the invention provides a convenient way for determining whether sufficient clearance exists to permit a vehicle to travel over a path of travel and, more specifically, whether a railroad car loaded with an oversize cargo may be routed along a section of tracks. For example, the cross sectional dimensions of a railroad car and its cargo may be entered into the computer 76 by means of an appropriate data entry device, such as the terminal 78. The computer 76 may be programmed to accept the dimensions of the car and cargo in either rectangular or polar coordinate form to increase the ease of data entry. The computer 76 may also be programmed to display the silhouette of the car and cargo on the monitor 82. A typical silhouette is illustrated in FIG. 3 and shows a flat car 120 carrying an irregularly shaped cargo 122.

The section of tracks over which it is desired to ship the cargo may then be entered into the computer 76; and the comparator 76 programmed to scan all of the data points for that section of tracks to provide a minimum clearance or maximum cargo envelope 123 (FIG. 4). The clearance envelope 123 defines the shape of the maximum cargo or largest load that may safely be shipped over that section of tracks. The computer 78 may be further programmed to combine the silhouette of the car 120 and the cargo 122 with the clearance envelope 123 to provide a composite silhouette (FIG. 5). The composite silhouette provides a convenient way for visually determining whether the cargo 122 may be safely transported along a selected section of tracks.

Obviously, many modifications and variations of the present invention are possible in light of the above teachings. Thus, it is to be understood that, within the scope of the appended claims, the invention may be practiced otherwise than as specifically described.

What is claimed and desired to be secured by Letters Patent of the United States is:

1. Apparatus for determining a clearance envelope along an elongated roadbed, comprising;
   means for emitting illumination in a radial direction about an axis parallel to said roadbed;
   means including a television camera aimed in a direction parallel to said axis responsive to illumination from said emitting means reflected by an object disposed along the length of and spaced from said roadbed;
   means for scanning said television camera with a plurality of radial scans for providing an electrical analog indication of the radial distance between said roadbed and said objects; and
   means for recording on a record medium said electrical analog indication.

2. Apparatus as recited in claim 1 further including means for generating a plurality of binary signals, each of said binary signals identifying one of said radial scans.

3. Apparatus as recited in claim 2 wherein said electrical analog indication comprises a video signal representative of said radial distance.

4. Apparatus as recited in claim 3 wherein said recording means includes a video tape recorder responsive to said video signal and said radial scan identifying binary signals for recording said signals on said record medium.

5. Apparatus as recited in claim 4 further including keyboard entry means for recording manually entered data on said record medium.

6. Apparatus as recited in claim 3 further including means for playing back said record medium and for providing a digital representation of said video signal.

7. Apparatus as recited in claim 6 further including means responsive to a plurality of said video signal digital representations for generating a visual display of the clearance envelope about a predetermined point on the path of travel.

8. Apparatus as recited in claim 7 wherein said visual display generating means includes means for generating the clearance envelope along a predetermined portion of said axis.

9. Apparatus as recited in claim 8 further including means for entering data representative of a cargo envelope into said visual display generating means for rendering said visual display generating means operative to provide a composite display of said cargo envelope and said clearance envelope.

10. Apparatus as recited in claim 7 wherein said record medium playing means and said visual display generating means are remotely located from said video signal recording means.

11. Apparatus as recited in claim 6 further including means for recording on a second record medium said digital representations of said video signal.

12. Apparatus as recited in claim 5 further including means for retrieving said manually entered data.

13. A system for determining the clearance envelope associated with a path of travel and objects disposed along the length of and spaced from said path of travel comprising
   means for directing a beam of coherent light for rotation about an axis of rotation parallel to the direction of and radially about said path of travel,
   a television camera directed in a direction parallel to said axis of rotation, said television camera being responsive to light reflected by objects disposed along said path of travel for providing an analog video signal indicative of the distance between the camera and said objects,
   means for scanning the field of said television camera, said scanning means including means for generating a digital representation for identifying each scanning line, and
   means for recording said video signal for subsequent processing by a remotely located processing system.

14. A system as recited in claim 13 wherein said scanning means includes means for radially scanning the field of said television camera.

15. A system as recited in claim 14 wherein said recording means includes a video tape recorder coupled to said television camera for recording said video signal.

16. A system as recited in claim 15 wherein said digital representation generating means is coupled to said recording means for recording said digital representations thereby to identify the video signal corresponding to each radial scanning line.

17. A system as recited in claim 16 wherein said radial scanning means includes means responsive to said digital representations for generating signals representative of the horizontal and vertical coordinates of the radial scanning line identified by each of said digital representations.

18. A system as recited in claim 17 wherein said horizontal and vertical coordinates representative signal generating means includes means for generating digital representations of the sine and cosine of the angle of the radial scanning line identified by each of said digital representations.

19. A system as recited in claim 18 wherein said sine and cosine generating means includes a read-only memory.

20. A system as recited in claim 18 further including means responsive to said sine and cosine digital representations for generating analog signals having amplitudes proportional to the values of each of said sine and cosine representative digital representations.

21. A system as recited in claim 20 further including means connected to said analog signal generating means for integrating said analog sine and cosine representative digital representations thereby to provide horizontal and vertical scanning signals for radially scanning the field of said television caamera.

22. A system as recited in claim 13 wherein said beam directing means includes a rotating reflector rotating about said axis of rotation and a laser directed toward said reflector.

23. A method for determining the cross sectional envelope defined by one or more obstacles radially disposed about a longitudinal axis parallel to an elongated path of travel comprising;
   scanning said obstacles with a rotary beam of light emitted radially about and relatively movable along said longitudinal axis to illuminate portions of said obstacles and to cause the area so illuminated to progress helically along said obstacles;
   detecting the illuminated portions of said obstacles, including the steps of aiming a television camera in a direction substantially parallel to said longitudinal axis and forming an image thereof on said television camera, said image having a shape similar to the cross section of the area between said longitudinal axis and the illuminated portions of said obstacles;

providing an electrical analog signal corresponding to said image, said electrical analog signal being a video signal provided by said camera, and representative of the radial distance between said illuminated portions of said obstacles and said longitudinal axis;

recording substantially all of said electrical analog signal on a record medium; and wherein the step of detecting the illuminated portions of said obstacles further includes the steps of scanning said television camera with a plurality of radial scanning lines and detecting changes in the amplitude of said video signal representative of the locations of the illuminated portions of said obstacles.

24. The method recited in claim 23 further including the steps of providing a digital identifying signal associated with each radial scanning line.

* * * * *